United States Patent
Gleason (10) Patent No.: US 11,736,231 B2
(45) Date of Patent: *Aug. 22, 2023

(54) METHOD AND APPARATUS FOR DETERMINING CONDITIONS FOR NON-TERMINATED SERVICE PROVIDER NETWORK CONNECTIONS

(71) Applicant: Charter Communications Operating, LLC, St. Louis, MO (US)

(72) Inventor: Nathan Gleason, Peyton, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,928

(22) Filed: Jan. 27, 2022

(65) Prior Publication Data
US 2022/0149984 A1 May 12, 2022

Related U.S. Application Data

(63) Continuation of application No. 16/744,476, filed on Jan. 16, 2020, now Pat. No. 11,271,677.

(51) Int. Cl.
*H04L 1/00* (2006.01)
*H04L 12/28* (2006.01)

(52) U.S. Cl.
CPC ........ *H04L 1/0048* (2013.01); *H04L 12/2801* (2013.01)

(58) Field of Classification Search
CPC ............... H04L 1/0048; H04L 12/2801; H04L 12/2869; H04L 43/0823; H04L 43/103; H04L 43/16; H04L 12/2861
See application file for complete search history.

(56) References Cited

U.S. PATENT DOCUMENTS

| | | | |
|---|---|---|---|
| 6,275,990 B1 * | 8/2001 | Dapper | G06F 17/14 375/E7.002 |
| 6,867,371 B2 | 3/2005 | Daoud et al. | |
| 7,181,213 B2 | 2/2007 | Su et al. | |
| 8,576,705 B2 | 11/2013 | Thibeault et al. | |

(Continued)

*Primary Examiner* — Dady Chery
(74) *Attorney, Agent, or Firm* — Young Basile Hanlon & MacFarlane, P.C.

(57) ABSTRACT

Disclosed herein are methods and systems for determining conditions for non-terminated service provider network connections. The method includes receiving, at a service provider headend, upstream signals from premises. An uncorrectable metric and a correctable metric are determined from a portion of the upstream signals upon application of signal correction to the upstream signals, where the portion is related to an operating frequency range of a networking device and an operating frequency range of Data Over Cable Service Interface Specification (DOCSIS) devices. An alert is generated when the determined uncorrectable metric meets an uncorrectable threshold and the determined correctable metric is less than a correctable threshold for a persistent period of time, where the non-termination alert indicates a non-terminated pathway to a service provider central office from the premises when service is provided to the premises from a different service provider central office.

20 Claims, 7 Drawing Sheets

(56) References Cited

U.S. PATENT DOCUMENTS

| | | | |
|---|---|---|---|
| 8,867,371 B2* | 10/2014 | Bowler | H04L 41/0677 |
| | | | 370/242 |
| 10,033,618 B1 | 7/2018 | Grinkemeyer et al. | |
| 10,560,729 B2 | 2/2020 | Soltanpur et al. | |
| 2016/0183268 A1* | 6/2016 | Albano | H04L 12/2801 |
| | | | 370/252 |
| 2016/0381565 A1 | 12/2016 | Oteri et al. | |

* cited by examiner

METHOD AND APPARATUS FOR DETERMINING CONDITIONS FOR NON-TERMINATED SERVICE PROVIDER NETWORK CONNECTIONS

CROSS REFERENCE TO RELATED APPLICATION

This application is a continuation of U.S. application Ser. No. 16/744,476 filed Jan. 16, 2020, of which is incorporated herein by reference.

TECHNICAL FIELD

This disclosure relates to networking. More specifically, this disclosure relates to noise introduced by non-terminated devices into a service provider network.

BACKGROUND

The recent and rapidly growing market for service providers to offer triple play services drives the need for robust high-speed home networking technology for distributing these services throughout the home using existing coaxial cables and telephone wiring within homes. The HomePNA Alliance (HPNA) is a non-profit industry association of companies that develops and standardizes technology for home networking over the existing coaxial cables and telephone wiring within homes. A HPNA setup would include a HPNA gateway and HPNA cards or external adapters for each computer, device, and the like in the home. The HPNA 2.0 standard uses frequencies from 4 MHz to 10 MHz and the HPNA 3.0 standard uses frequencies from 4 MHz to 21 MHz.

The North American Upstream standard for Data Over Cable Service Interface Specification (DOCSIS) cable modems to communicate to the Cable Modem Termination System (CMTS) is 5 MHz to 42 MHz. The CMTS is typically located in a service provider's central office, headend or hubsite and provides high speed data services, such as cable Internet or Voice over Internet Protocol, to service provider subscribers.

Given the frequency overlap between the HPNA and DOCSIS standards, non-terminated HPNA devices in a home cause signals to be fed back in the upstream channels of the network and results in slower network speeds to subscribers that are connected to that network via a common node, switch, and/or the like.

SUMMARY

Disclosed herein are methods and apparatus for determining conditions for non-terminated service provider network connections. In an implementation, the method includes receiving, at a service provider headend, upstream signals from premises. An uncorrectable metric and a correctable metric are determined, from a portion of the upstream signals, based on application of signal correction to the upstream signals. The portion being related to an operating frequency range of a networking device and an operating frequency range of Data Over Cable Service Interface Specification (DOCSIS) devices. The service provider headend determines whether a determined uncorrectable metric meets an uncorrectable threshold and whether a determined correctable metric is less than a correctable threshold. An interference alert is set when the determined uncorrectable metric meets the uncorrectable threshold and the determined correctable metric is less than the correctable threshold for a defined number of times overs a defined time interval. The interference alert indicating a non-terminated pathway to the service provider headend from the premises when service is provided to the premises from a different service provider headend.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Figure 1:
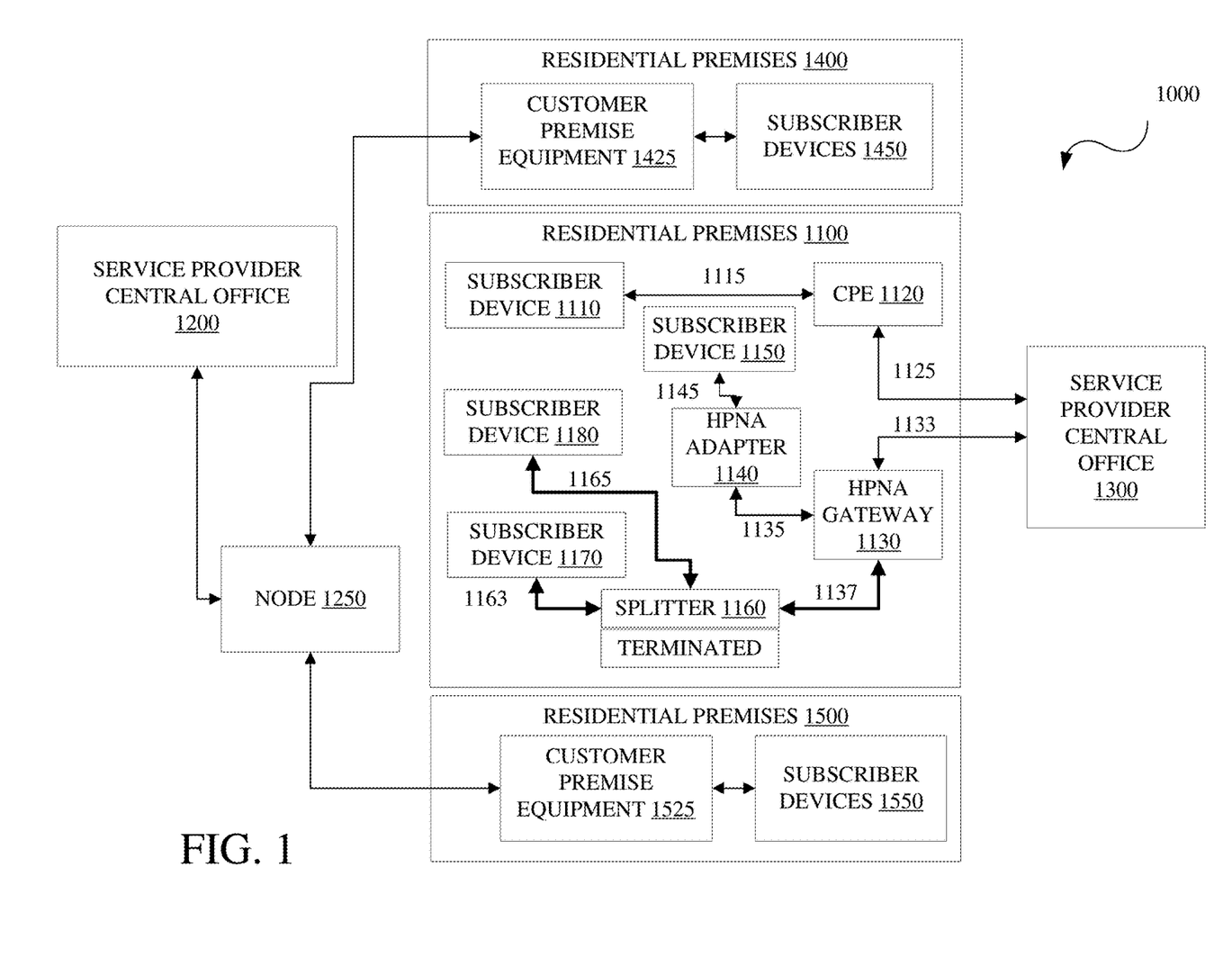
FIG. 1 is a diagram of an example architecture of a system and a home network properly terminated.

FIG. 1 is a diagram of an example architecture of a system 1000 which includes proper equipment termination. The system 1000 includes a residential premises 1100 which was previously connected to or in communication with (collectively "connected to") a service provider central office, headend, or hub 1200 (collectively "central office 1200") via a node 1250 and is now connected to a service provider central office 1300. The service provider central office 1200 remains connected to residential premises 1400 and 1500 via node 1250. Residential premises are used in this description for purposes of illustration and the description is applicable to other premises such as offices, buildings, commercial premises, and the like without departing from the scope of the specification and/or claims. The connections described herein use a variety of wired and/or wireless techniques.

The service provider central office 1200 and service provider central office 1300 each may include servers, switches, transceivers, optical line terminal, and other equipment configured to transmit or stream downstream signals including data, content, and commands (collectively "data") to a residential premises and receive upstream signals including data from the residential premises. The service provider central office 1200 and service provider central office 1300 are typically connected to residential premises via customer premises equipment (CPE) as described herein.

The node 1250 can be service provider equipment including switches, repeaters, routers, and the like which bidirectionally communicates data between the service provider central office 1200 and connected residential premises such as residential premises 1400 and 1500.

The residential premises 1400 and 1500 include subscriber devices 1425 and 1525, respectively, and CPE 1450 and 1550, respectively. The subscriber devices 1425 and 1525 may be any type of device which may communicate via the CPE 1450 and 1550, respectively, including, but not limited to, televisions, phones, computers, smart devices, and the like. The CPE 1450 and 1550 may be any terminal and associated equipment located at a subscriber's premises or the residential premises and connected with the service provider's network, e.g., the service provider central office. The CPE 1450 and 1550 can include, but is not limited to, routers, network switches, residential gateways (RG), set-top boxes, fixed mobile convergence products, home networking adapters, Internet access gateways, and the like.

The residential premises 1100 may include a subscriber device 1110 connected to a CPE 1120, which in turn is connected to the service provider central office 1300. The connections may be implemented using, for example, telephone lines 1115 and 1125. The service provider central office 1300 is further connected to a HPNA gateway 1130 via a telephone line 1133. The HPNA gateway 1130 is connected to a HPNA adapter 1140 via a telephone line 1135. The HPNA adapter 1140 is connected to a subscriber device 1150 via an Ethernet cable 1145, for example. The HPNA gateway 1130 is also connected to a splitter 1160 via a coaxial cable 1137. The splitter 1160 is connected to subscriber devices 1170 and 1180 via coaxial cables 1163 and 1165, respectively.

The residential premises 1100, 1400, and 1500, the service provider central office 1200, the service provider central office 1300, the node 1250, the CPEs 1425, 1525, and 1120, the subscriber devices 1450, 1550, 1110, 1150, 1170 and 1180, and the splitter 1160 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
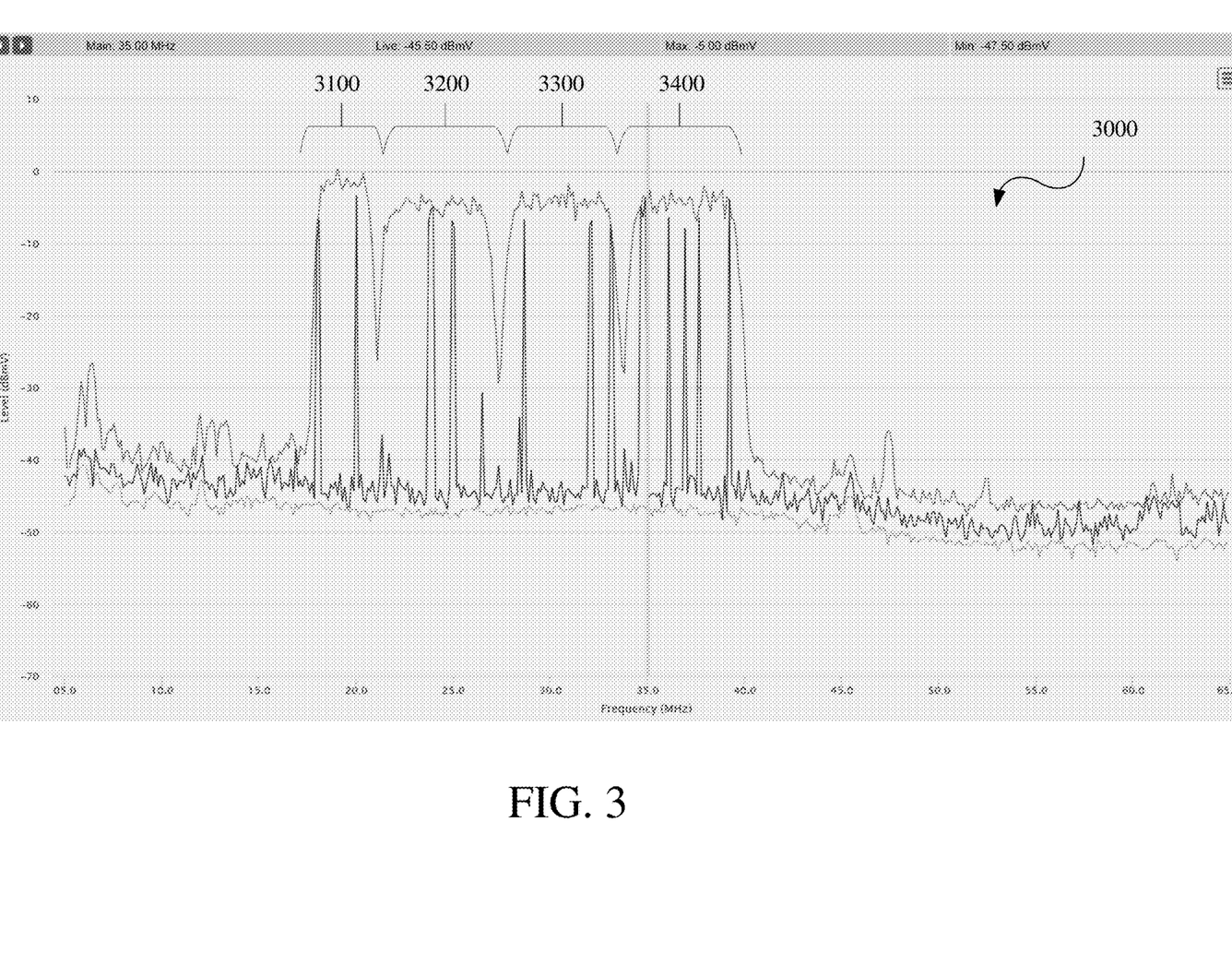
FIG. 3 is a photograph of an example upstream signal with no signal interference.

Operationally, the residential premises 1100 was initially connected to the service provider central office 1200 via the splitter 1160 or like device. The service provider central office 1200 would have provided service to subscriber devices 1170 and 1180 directly and to subscriber device 1150 via the HPNA gateway 1130 and HPNA adapter 1140. When changing from the service provider central office 1200 to the service provider central office 1300, the splitter 1160 is terminated so that there is no pathway to the service provider central office 1200 via the splitter 1160. FIG. 3 is a photograph of an example upstream signal 3000 with no signal interference. The upstream signal 3000 has, for example, a multi-mesa waveform. In an implementation, the upstream signal 3000 has a four mesa structure which includes a first mesa 3100 beginning at approximately 19 MHz, a second mesa 3200 beginning at approximately 24 MHz, a third mesa 3300 beginning at approximately 30 MHz, and a fourth mesa 3400 beginning at approximately 37 MHz.

Figure 2:
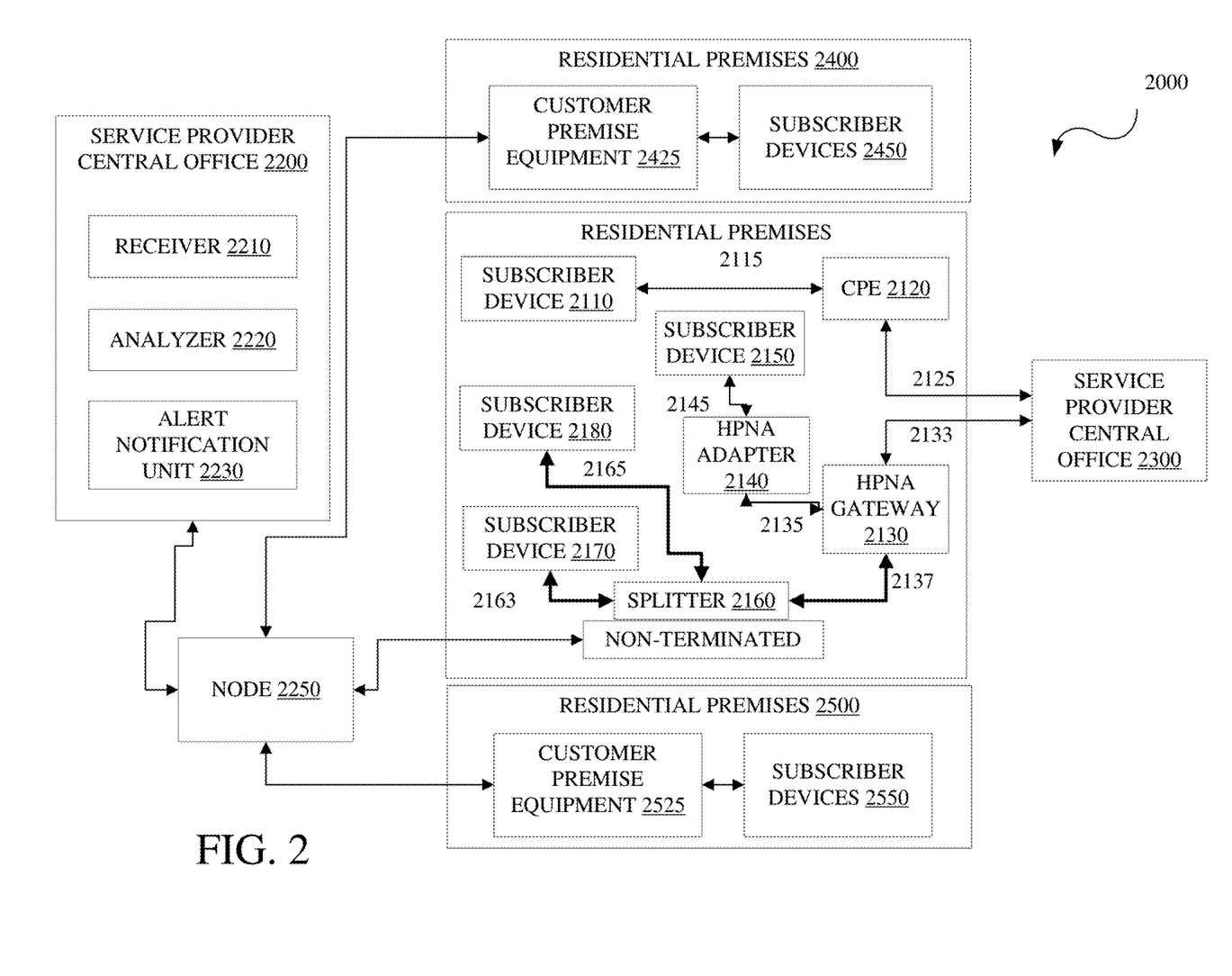
FIG. 2 is a diagram of an example architecture of a system and a home network in a non-terminated in accordance with embodiments of this disclosure.

FIG. 2 is a diagram of an example architecture of a system 2000 which includes improper equipment termination. The system 2000 includes a residential premises 2100 which was previously connected to or in communication with (collectively "connected to") a service provider central office, headend, or hub 2200 (collectively "central office 2200") via a node 2250 and is now connected to a service provider central office 2300. The service provider central office 2200 remains connected to residential premises 2400 and 2500 via node 2250. Residential premises are used in this description for purposes of illustration and the description is applicable to other premises such as offices, buildings, commercial premises, and the like without departing from the scope of the specification and/or claims. The connections described herein use a variety of wired and/or wireless techniques.

The service provider central office 2200 and service provider central office 2300 each may include servers, switches, transceivers, optical line terminal, and other equipment configured to transmit or stream downstream signals including data, content, and commands (collectively "data") to a residential premises and receive upstream signals including data from the residential premises. The service provider central office 2200 and service provider central office 2300 are typically connected to residential premises via customer premises equipment (CPE) as described herein.

The service provider central office 2200 includes a receiver 2210, an analyzer 2220, and an alert notification unit 2230. In an implementation, the analyzer 2220 and the alert notification unit 2230 may be an integrated server or element. The receiver 2210 can receive upstream signals from devices including, for example, the subscriber devices 2450, 2550, 2110, 2150, 2170 and 2180. The analyzer 2220 may analyze the upstream signal or waveform and determine signal characteristics including, for example, level of uncorrectable FEC, correctable FEC, and like characteristics. In an implementation, the analyzer 2220 may generate an alert in the presence of signal interference which matches defined criteria. The alert notification unit 2230 provides a visual, audible, or combination thereof indication responsive to an alert determined by the analyzer 2220.

The node 2250 can be service provider equipment including switches, repeaters, routers, and the like which bidirectionally communicates data between the service provider central office 2200 and connected residential premises such as residential premises 2400 and 1500.

The residential premises 2400 and 2500 include subscriber devices 2425 and 2525, respectively, and CPE 2450 and 2550, respectively. The subscriber devices 2425 and 2525 may be any type of device which may communicate via the CPE 2450 and 2550, respectively, including, but not limited to, televisions, phones, computers, smart devices, and the like. The CPE 2450 and 2550 may be any terminal and associated equipment located at a subscriber's premises or the residential premises and connected with the service provider's network, e.g., the service provider central office. The CPE 2450 and 2550 can include, but is not limited to, routers, network switches, residential gateways (RG), set-top boxes, fixed mobile convergence products, home networking adapters, Internet access gateways, and the like.

The residential premises 2100 may include a subscriber device 2110 connected to a CPE 2120, which in turn is connected to the service provider central office 2300. The connections may be implemented using, for example, telephone lines 2115 and 2125. The service provider central office 2300 is further connected to a HPNA gateway 2130 via a telephone line 2133. The HPNA gateway 2130 is connected to a HPNA adapter 2140 via a telephone line 2135. The HPNA adapter 2140 is connected to a subscriber device 2150 via an Ethernet cable 2145, for example. The HPNA gateway 2130 is also connected to a splitter 2160 via a coaxial cable 2137. The splitter 2160 is connected to subscriber devices 2170 and 2180 via coaxial cables 2163 and 2165, respectively.

The residential premises 2100, 2400, and 2500, the service provider central office 2200, the service provider central office 2300, the node 2250, the CPEs 2425, 2525, and 2120, the subscriber devices 2450, 2550, 2110, 2150, 2170 and 2180, and the splitter 2160 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Operationally, the residential premises 2100 was initially connected to the service provider central office 2200 via the splitter 2160 or like device. The service provider central office 2200 would have provided service to subscriber devices 2170 and 2180 directly and to subscriber device 2150 via the HPNA gateway 2130 and HPNA adapter 2140.

When changing from the service provider central office 2200 to the service provider central office 2300, the splitter 2160 is not terminated so that there is a pathway to the service provider central office 2200 via the splitter 2160 and the node 2250.

In this instance, the HPNA gateway 2130 and/or HPNA adapter 2140 may back feed signals to the network of the service provider associated with the service provider central office 2200. As noted, the operational frequencies of the HPNA gateway 2130 and/or HPNA adapter 2140 are 4 MHz to 21 MHz and the DOCSIS devices are from 5 MHz to 42 MHz. The non-terminated or improperly terminated splitter 2160 creates signal interference between the HPNA gateway 2130 and/or HPNA adapter 2140 and the upstream DOCSIS cable modem traffic causing high Uncorrectable Forward Error Correction (FEC) errors. This affects all customers that are connected to the same node(s) in the network. This noise causes slow intermittent speed to customers using high speed internet a need for an alarm or alert arose.

Figure 4:
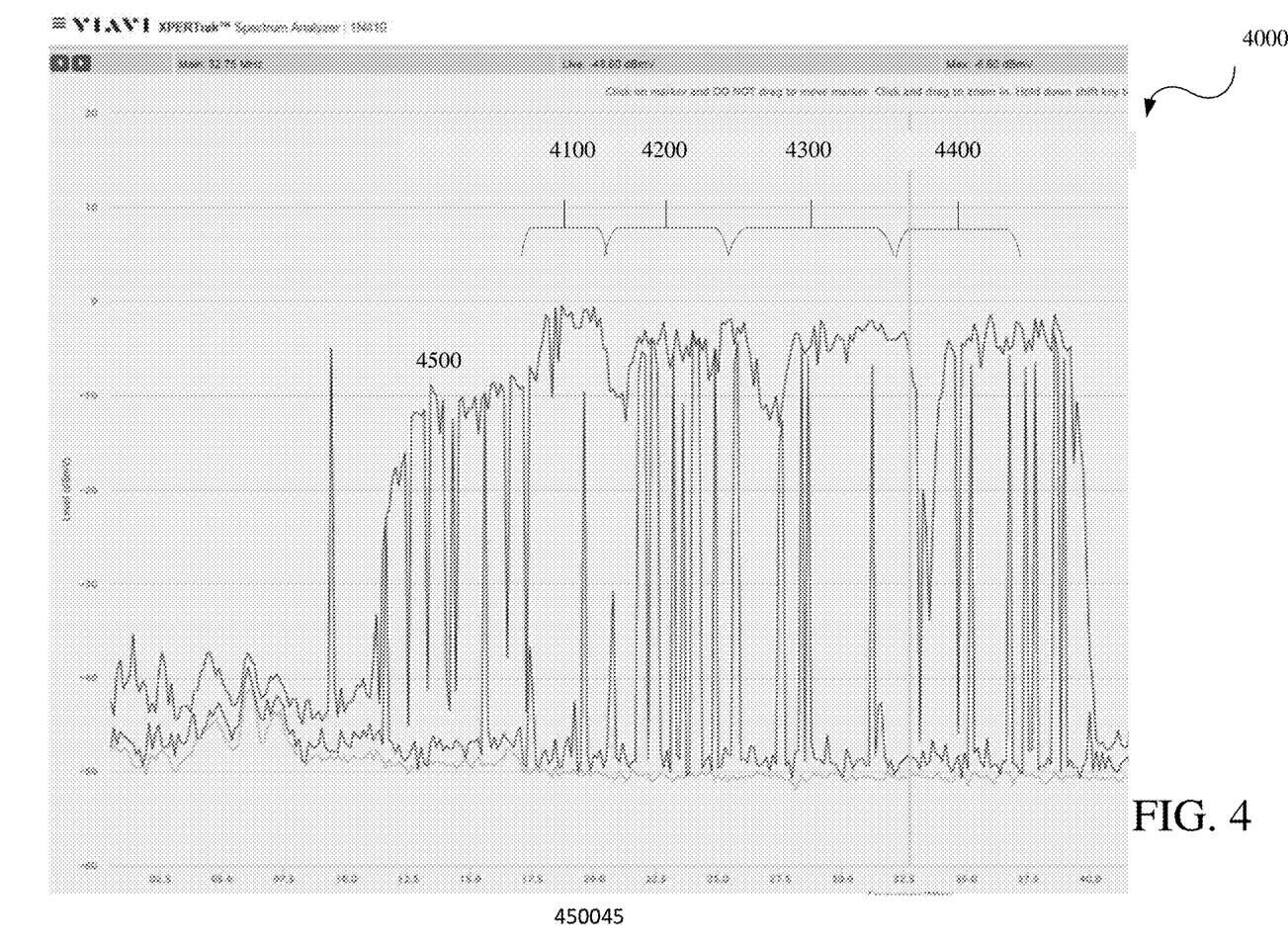
FIG. 4 is a photograph of an example upstream signal with signal interference.

FIG. 4 is a photograph of an example upstream signal 4000 with signal interference. The upstream signal 4000 has, for example, a multi-mesa waveform. In an implementation, the upstream signal 4000 has a four mesa structure which includes a first mesa 4100 beginning at approximately 19 MHz, a second mesa 4200 beginning at approximately 17 MHz, a third mesa 4300 beginning at approximately 27 MHz, and a fourth mesa 4400 beginning at approximately 33 MHz. However, in this instance, the upstream signal 4000 prior to and at the first mesa 4100 shows the presence of signal interference 4500 from the HPNA gateway 2130 and HPNA adapter 2140 via the unterminated splitter 2160. Although the HPNA signal interference is primarily indicated at or near the first mesa 4100, signal interference may be indicated in the other mesas of the upstream signal 4000.

The analyzer 2220 determines the percentage of uncorrectable FEC errors and the percentage of correctable FEC errors. If the percentage of uncorrectable FEC errors meets or exceeds a correctable defined threshold and the percentage of correctable FEC errors is less than an uncorrectable defined threshold, then the analyzer 2220 checks if the HPNA signal interference occurs over a defined timeframe. The analyzer 2220 checks for HPNA signal interference persistency by polling the upstream signal at defined intervals during the defined timeframe. An alert is generated if the percentage of uncorrectable FEC errors meets or exceeds the correctable defined threshold and the percentage of correctable FEC errors is less than the uncorrectable defined threshold for each polling event. The alert notification unit 2230 indicates the alert as appropriate. A corrective measure or action is then undertaken to correct the unterminated device at the indicated residential premises or the like.

Figure 5:
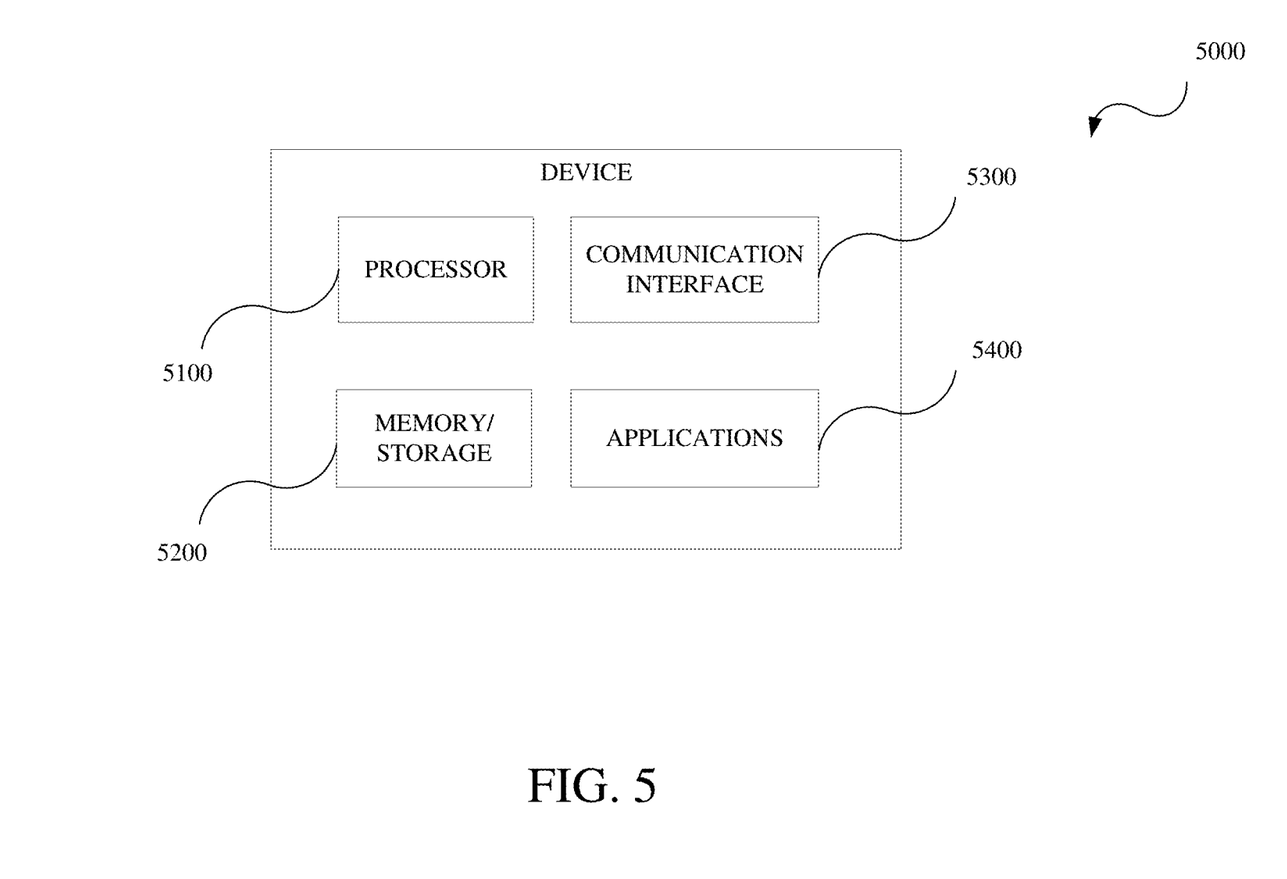
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. The device 5000 may include or implement, for example, the service provider central office 2200, the service provider central office 2300, the receiver 2210, the analyzer 2220, the alert notification unit 2230, the node 2250, the CPEs 2425, 2525, and 2120, the subscriber devices 2450, 2550, 2110, 2150, 2170 and 2180, the splitter 2160, the service provider central office 1200, the service provider central office 1300, the node 1250, the CPEs 1425, 1525, and 1120, the subscriber devices 1450, 1550, 1110, 1150, 1170 and 1180, and the splitter 1160. In an implementation, the memory/storage 3200 may store the output of the analyzer 2220. The methods for determining conditions for non-terminated service provider network connections described herein may be stored in the memory/storage 5200 and executed by the processor 5100 in cooperation with the memory/storage 5200, the communications interface 5300, and applications 5400, as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
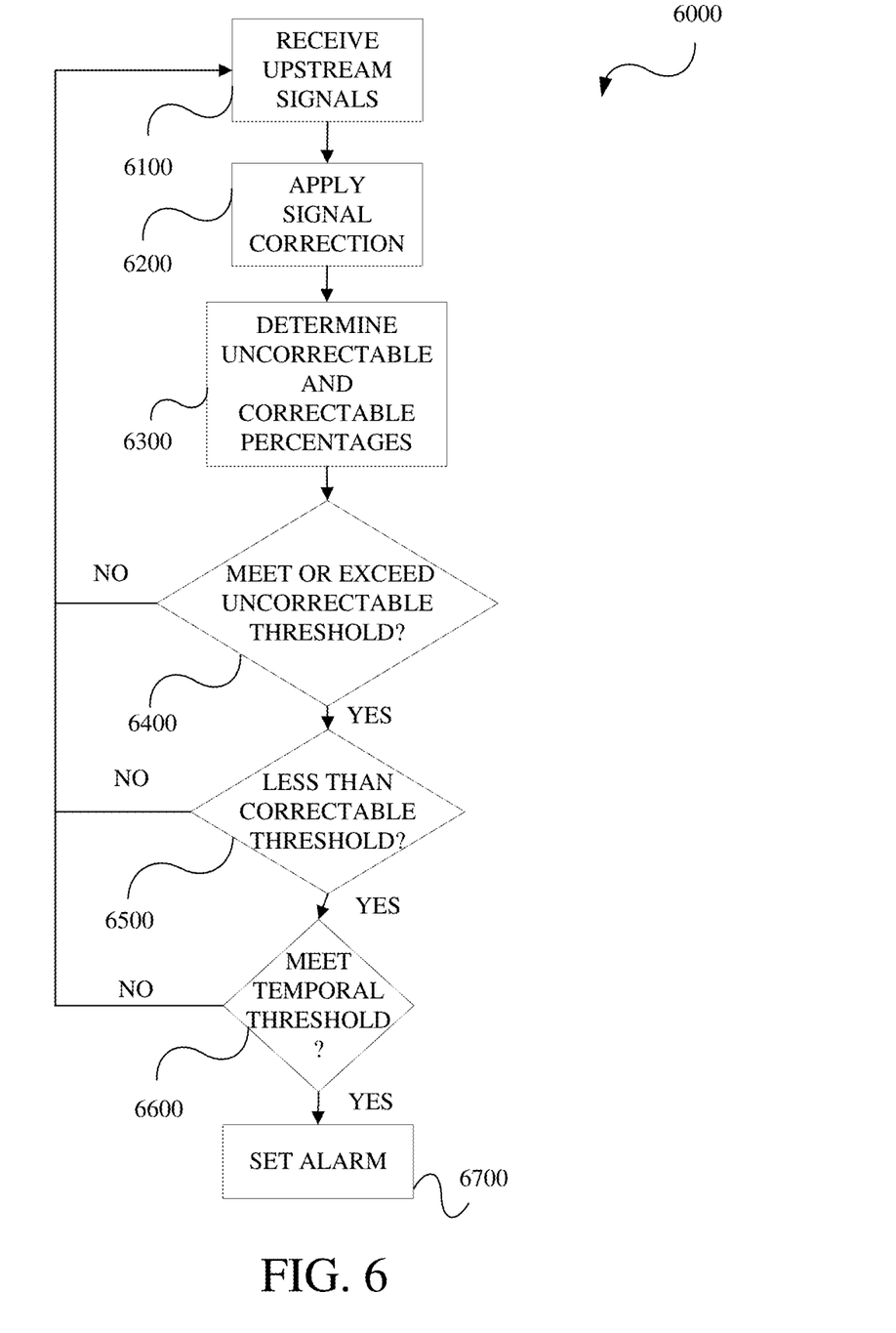
FIG. 6 is a flowchart of an example method for determining conditions for non-terminated service provider network connections in accordance with embodiments of this disclosure.

FIG. 6 is a flowchart of an example method 6000 for determining conditions for non-terminated service provider network connections in accordance with embodiments of this disclosure. The method 6000 includes: receiving 6100 upstream signals; applying 6200 signal correction; determining 6300 uncorrectable and correctable percentages; checking 6400 whether determined uncorrectable percentage meets an uncorrectable threshold; checking 6500 whether determined correctable percentage meets a correctable threshold; checking 6600 whether the uncorrectable threshold and the correctable threshold meets a temporal threshold; and setting 6700 an interference alert. For example, the technique 6000 may be implemented, as applicable and appropriate, by the service provider central office 2200, the service provider central office 2300, the receiver 2210, the analyzer 2220, the alert notification unit 2230, the node 2250, the CPEs 2425, 2525, and 2120, the subscriber devices 2450, 2550, 2110, 2150, 2170 and 2180, the splitter 2160, the service provider central office 1200, the service provider central office 1300, the node 1250, the CPEs 1425, 1525, and 1120, the subscriber devices 1450, 1550, 1110, 1150, 1170 and 1180, and the splitter 1160.

The method 6000 includes receiving 6100 upstream signals. A service provider central office and receiver receive upstream signals from connected premises. The upstream signals can include data, control, content, and the like (collectively "data"). In an implementation, digital signal processing techniques including digital signal correction techniques can be applied to the upstream signals to enhance data reliability. In an implementation, forward error correction (FEC) can be used to introduce redundant data in the upstream signals prior to data transmission. FEC provides the receiver with the ability to correct errors without a reverse channel to request the retransmission of data.

The method 6000 includes applying 6200 signal correction. Digital signal correction techniques are applied by the receiver to the upstream signal to attempt to correct any errors that may have occurred due to signal interference, noisy channel conditions, and the like.

The method 6000 includes determining 6300 uncorrectable and correctable percentages. An analyzer at the service provider central office counts the number of bits successfully corrected and the number of bits unsuccessfully corrected in a frequency or wavelength portion of the upstream signal. In an implementation, the portion is or is proximate to an operating frequency range of HPNA devices. In an implementation, the portion is proximate to 17 MHz. In an implementation, the portion is proximate to 19 MHz. In an implementation, the portion is proximate to an operating frequency range of DOCSIS devices. In an implementation, the portion is proximate to operating frequency ranges of the HPNA devices and the DOCSIS devices. The analyzer determines a metric based on the correctable count and the uncorrectable count. In an implementation, the metric is percentage. For example, the number of correctable bits is divided by the total number of bits being analyzed.

The method 6000 includes checking 6400 whether determined uncorrectable percentage meets an uncorrectable threshold. The analyzer determines if the determined uncorrectable percentage meets or exceeds the uncorrectable threshold. In an implementation, the uncorrectable threshold is 1.99% when the metric is percentage based. In an implementation, no alert is provided if the uncorrectable percentage is below the uncorrectable threshold.

The method 6000 includes checking 6500 whether determined correctable percentage meets a correctable threshold. When the uncorrectable percentage meets or exceeds the uncorrectable threshold, the analyzer checks if the determined correctable percentage is below or less than the correctable threshold. In an implementation, the correctable threshold is 1.00% when the metric is percentage based. In an implementation, no alert is provided if the correctable percentage is above the correctable threshold.

The method 6000 includes checking 6600 whether the uncorrectable threshold and the correctable threshold meets a temporal threshold. When the uncorrectable percentage meets or exceeds the uncorrectable threshold and the correctable percentage is less than the correctable threshold, then the analyzer confirms temporal persistency of the uncorrectable percentage and the correctable percentage. In an implementation, the temporal persistency is determined by polling the upstream signal a defined number of times over a defined time interval (collectively "temporal threshold") to differentiate between non-terminated equipment signal interference and noise. In an implementation, the temporal threshold is polling 9 times over a 45 minute time interval. In an implementation, the temporal threshold is polling 12 times over a 60 minute time interval to increase reliability and accuracy. In an implementation, the temporal threshold is variable in terms of number of polling events and length of time interval. In an implementation, the temporal threshold is configurable in terms of number of polling events and length of time interval.

The method 6000 includes setting 6700 an interference alert. An alert is given or initiated when the uncorrectable percentage meets or exceeds the uncorrectable threshold and the correctable threshold is below or less than the correctable threshold for each poll during the time interval (i.e. meets the temporal threshold). The alert may be audible, visual, combinations thereof, and the like. A corrective action is taken with respect to the non-terminated equipment after an alert is initiated.

Figure 7:
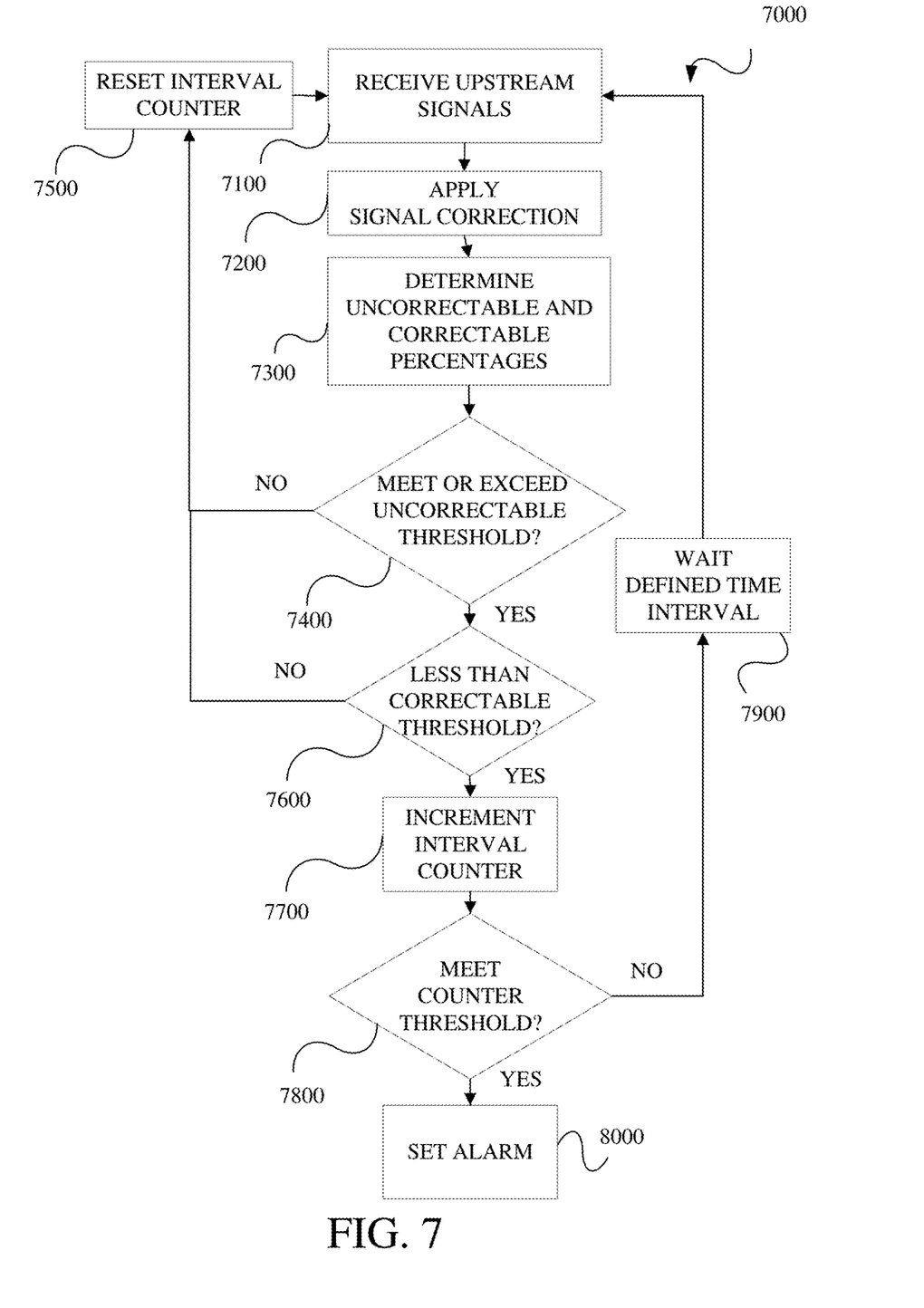
FIG. 7 is a flowchart of an example method for determining conditions for non-terminated service provider network connections in accordance with embodiments of this disclosure.

FIG. 7 is a flowchart of an example method 7000 for determining conditions for non-terminated service provider network connections in accordance with embodiments of this disclosure. The method 7000 includes: receiving 7100 upstream signals; applying 7200 signal correction; determining 7300 uncorrectable and correctable metrics; checking 7400 whether determined uncorrectable metric meets an uncorrectable threshold; resetting 7500 counter; checking 7600 whether determined correctable metric meets a correctable threshold; incrementing 7700 a counter; checking 7800 if counter meets counter threshold; waiting 7900 for next signal analysis; and setting 8000 an alarm. For example, the technique 7000 may be implemented, as applicable and appropriate, by the service provider central office 2200, the service provider central office 2300, the receiver 2210, the analyzer 2220, the alert notification unit 2230, the node 2250, the CPEs 2425, 2525, and 2120, the subscriber devices 2450, 2550, 2110, 2150, 2170 and 2180, the splitter 2160, the service provider central office 1200, the service provider central office 1300, the node 1250, the CPEs 1425, 1525, and 1120, the subscriber devices 1450, 1550, 1110, 1150, 1170 and 1180, and the splitter 1160.

The method 7000 includes receiving 7100 upstream signals. A service provider central office and receiver receive upstream signals from connected premises. The upstream signals can include data, control, content, and the like (collectively "data"). In an implementation, digital signal processing techniques including digital signal correction techniques can be applied to the upstream signals to enhance data reliability. In an implementation, forward error correction (FEC) can be used to introduce redundant data in the upstream signals prior to data transmission. FEC provides the receiver with the ability to correct errors without a reverse channel to request the retransmission of data.

The method 7000 includes applying 7200 signal correction. Digital signal correction techniques are applied by the receiver to the upstream signal to attempt to correct any errors that may have occurred due to signal interference, noisy channel conditions, and the like.

The method 7000 includes determining 7300 uncorrectable and correctable metrics. An analyzer at the service provider central office counts the number of bits successfully corrected and the number of bits unsuccessfully corrected in a frequency or wavelength portion of the upstream signal. In an implementation, the portion is or is proximate to an operating frequency range of HPNA devices. In an implementation, the portion is proximate to 17 MHz. In an implementation, the portion is proximate to 19 MHz. In an implementation, the portion is proximate to an operating frequency range of DOCSIS devices. In an implementation, the portion is proximate to operating frequency ranges of the HPNA devices and the DOCSIS devices. The analyzer determines a metric based on the correctable count and the uncorrectable count. In an implementation, the metric is percentage. For example, the number of correctable bits is divided by the total number of bits being analyzed.

The method 7000 includes checking 7400 whether determined uncorrectable metric meets an uncorrectable threshold. The analyzer determines if the determined uncorrectable metric meets or exceeds the uncorrectable threshold. In an implementation, the uncorrectable threshold is 1.99% when the metric is percentage based.

The method 7000 includes resetting 7500 a persistency counter. In the event that the uncorrectable percentage is below the uncorrectable threshold, a persistency counter may be reset. The persistency counter may be used to ensure that it is signal interference as opposed to noise, which may be intermittent. In an implementation, no alert is provided if the uncorrectable percentage is below the uncorrectable threshold.

The method 7000 includes checking 7600 whether determined correctable metric meets a correctable threshold. When the uncorrectable percentage meets or exceeds the uncorrectable threshold, the analyzer checks if the determined correctable percentage is below or less than the correctable threshold. In an implementation, the correctable threshold is 1.00% when the metric is percentage based. In an implementation, the persistency counter is reset and no alert is provided if the correctable percentage is above the correctable threshold.

The method 7000 includes incrementing 7700 a counter. When the uncorrectable percentage meets or exceeds the uncorrectable threshold and the correctable threshold is below or less than the correctable threshold, then the persistency counter is incremented.

The method 7000 includes checking 7800 if the persistency counter meets a counter threshold. In an implementation, the persistency counter is variable in terms of number of polling events. In an implementation, the persistency counter is configurable in terms of number of polling events.

The method 7000 includes waiting 7900 for next signal analysis. The analyzer waits for a next polling interval when the persistency counter is below the counter threshold. In an implementation, the polling interval is variable. In an implementation, the polling interval is configurable.

The method 7000 includes setting 8000 an alarm. An alert is given or initiated when the persistency counter meets the counter threshold. The alert may be audible, visual, combinations thereof, and the like. A corrective action is taken with respect to the non-terminated equipment after an alert is initiated.

In general, a method for determining conditions for non-terminated service provider network connections includes receiving, at a service provider headend, upstream signals from premises, determining from a portion of the upstream signals, by the service provider headend, an uncorrectable metric based on application of signal correction to the upstream signals, the portion related to an operating frequency range of a networking device and an operating frequency range of Data Over Cable Service Interface Specification (DOCSIS) devices, determining, by the service provider headend, from the portion of the upstream signals, by the service provider headend, a correctable metric based on application of signal correction to the upstream signals, checking, by the service provider headend, whether a determined uncorrectable metric meets an uncorrectable threshold, checking, by the service provider headend, whether a determined correctable metric is less than a correctable threshold, and setting, by the service provider headend, an interference alert when the determined uncorrectable metric meets the uncorrectable threshold and the determined correctable metric is less than the correctable threshold for a temporal threshold, the interference alert indicating a non-terminated pathway to the service provider headend from the premises. In an implementation, the signal correction is forward error correction. In an implementation, uncorrectable metric determination further includes counting a number of uncorrectable errors in the portion of the upstream signals and determining the uncorrectable metric from the number of uncorrectable errors. In an implementation, correctable metric determination further includes counting a number of correctable errors in the portion of the upstream signals and determining the correctable metric from the number of correctable errors. In an implementation, the uncorrectable metric and the correctable metric are each percentages. In an implementation, the temporal threshold is determined by polling the portion of the upstream signals at a defined polling interval over a defined time interval and determining whether the determined uncorrectable metric meets the uncorrectable threshold and the determined correctable metric is less than a correctable threshold for each polling event. In an implementation, the method further includes incrementing a counter each time the determined uncorrectable metric meets the uncorrectable threshold and the determined correctable metric is less than a correctable threshold, wherein the setting occurs when the counter meets a defined counter threshold. In an implementation, the interference alert is at least one of an audio alert or a visual alert.

In general, a method for determining non-terminated service provider connections includes receiving, at a headend receiver, upstream communications from premises, determining from a defined frequency range of the upstream communications, by an analyzer unit, an uncorrectable percentage from error correction processing of the upstream communications, the defined frequency range being related to a Data Over Cable Service Interface Specification (DOCSIS) operating frequency range, determining from the frequency range of the upstream communications, by the analyzer unit, a correctable percentage from the error correction processing of the upstream communications, setting, by the analyzer unit, a non-termination alert when the determined uncorrectable percentage meets an uncorrectable threshold and the determined correctable percentage is less than a correctable threshold for a defined number of times over a defined time interval, wherein the non-termination alert indicates a non-terminated pathway to a service provider central office from the premises, and providing, by an alert notification unit, the non-termination alert to initiate corrective actions. In an implementation, the error correction is forward error correction. In an implementation, uncorrectable percentage determination further includes counting a number of uncorrectable errors in the defined frequency range of the upstream communications and determining the uncorrectable percentage from the number of uncorrectable errors. In an implementation, correctable percentage determination further includes counting a number of correctable errors in the defined frequency range of the upstream communications and determining the correctable percentage from the number of correctable errors. In an implementation, the method further includes polling at the defined frequency range of the upstream communications at a defined polling interval, determining whether the determined uncorrectable percentage meets the uncorrectable threshold and the determined correctable percentage is less than a correctable threshold for each polling event, incrementing a persistency counter each time the determined uncorrectable percentage meets the uncorrectable threshold and the determined correctable percentage is less than a correctable threshold, and resetting the persistency counter when the determined uncorrectable percentage is less than the uncorrectable threshold or when the determined correctable percentage is not less than a correctable threshold, where the setting occurs when the persistency counter meets the defined number of times. In an implementation, the interference alert is at least one of an audio alert or a visual alert.

In general, a service provider system includes an upstream receiver configured to receive upstream signals from premises and a processor in communication with the upstream receiver. The processer configured to determine from a portion of the upstream signals an uncorrectable metric based on signal correction processing of the upstream signals, the portion related to an overlap frequency range between a premises networking device and Data Over Cable Service Interface Specification (DOCSIS) devices, determine from the portion of the upstream signals a correctable metric based on signal correction processing of the upstream signals, and generate a non-termination alert when the determined uncorrectable metric meets an uncorrectable threshold and the determined correctable metric is less than a correctable threshold for a persistent period of time, wherein the non-termination alert indicates a non-terminated pathway to a service provider central office from the premises when service is provided to the premises from a different service provider central office. In an implementation, the processor further configured to count a number of uncorrectable errors in the portion of the upstream signals, determine the uncorrectable metric from the number of uncorrectable errors, count a number of correctable errors in the portion of the upstream signals, and determine the correctable metric from the number of correctable errors. In an implementation, the uncorrectable metric and the correctable metric are each percentages. In an implementation, the processor further configured to poll the portion of the upstream signals at defined intervals over the persistent period of time, determine whether the determined uncorrectable metric meets the uncorrectable threshold and the determined correctable metric is less than a correctable threshold for each polling event, and increment a counter each time the determined uncorrectable metric meets the uncorrectable threshold and the determined correctable metric is less than a correctable threshold, where non-termination alert generation occurs when the counter meets a defined threshold. In an implementation, the processor further configured to reset the counter when the determined uncorrectable metric is less than the uncorrectable threshold or when the determined correctable metric is not less than a correctable threshold. In an implementation, the non-termination alert is at least one of an audio alert or a visual alert.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for determining conditions for non-terminated service provider network connections, the method comprising:
   determining, by a service provider, from an overlap frequency range of upstream signals received from a premises, an uncorrectable metric based on application of signal correction to the upstream signals and a correctable metric based on application of the signal correction to the upstream signals, the overlap frequency range related to an operating frequency range of more than one networking device;
   checking, by the service provider, whether the determined uncorrectable metric at least meets an uncorrectable threshold;
   checking, by the service provider, whether the determined correctable metric is less than a correctable threshold; and
   setting, by the service provider, a non-termination alert when the determined uncorrectable metric at least meets the uncorrectable threshold and the determined correctable metric is less than the correctable threshold, wherein the non-termination alert indicates a presence of a non-terminated device in or at the premises.

2. The method of claim 1, wherein the more than one networking device are associated with different service providers.

3. The method of claim 1, wherein uncorrectable metric determination further comprises:
   counting a number of uncorrectable errors in the portion of the upstream signals; and
   determining the uncorrectable metric from the number of uncorrectable errors.

4. The method of claim 3, wherein correctable metric determination further comprises:
   counting a number of correctable errors in the portion of the upstream signals; and
   determining the correctable metric from the number of correctable errors.

5. The method of claim 4, wherein the uncorrectable metric and the correctable metric are each percentages.

6. The method of claim 4, wherein the determined uncorrectable metric at least meets the uncorrectable threshold for a defined period of time and the determined correctable metric is less than the correctable threshold for the defined period of time and the defined period of time is determined by:
   polling the portion of the upstream signals at a defined polling interval; and
   determining whether the determined uncorrectable metric at least meets the uncorrectable threshold and the determined correctable metric is less than a correctable threshold for each polling event.

7. The method of claim 6, further comprising:
   incrementing a counter each time the determined uncorrectable metric at least meets the uncorrectable threshold and the determined correctable metric is less than a correctable threshold, wherein the setting occurs when the counter at least meets a defined counter threshold.

8. A method for determining non-terminated service provider connections, the method comprising:
   determining, by an analyzer unit, from a defined frequency range of upstream communications received from premises an uncorrectable percentage and a correctable percentage from error correction processing of the upstream communications, the defined frequency range being related to a network device operating frequency range;
   setting, by the analyzer unit, a non-termination alert when the determined uncorrectable percentage at least meets an uncorrectable threshold and the determined correctable percentage is less than a correctable threshold, wherein the non-termination alert indicates a presence of a non-terminated device in or at the premises; and
   providing, by an alert notification unit, the non-termination alert to initiate corrective actions.

9. The method of claim 8, wherein the determined uncorrectable percentage at least meets the uncorrectable threshold and the determined correctable percentage is less than the correctable threshold for a defined number of times over a defined time interval.

10. The method of claim 9, further comprising:
    polling at the defined frequency range of the upstream communications at a defined polling interval;
    determining whether the determined uncorrectable percentage at least meets the uncorrectable threshold and the determined correctable percentage is less than a correctable threshold for each polling event;
    incrementing a persistency counter each time the determined uncorrectable percentage at least meets the uncorrectable threshold and the determined correctable percentage is less than a correctable threshold; and
    resetting the persistency counter when the determined uncorrectable percentage is less than the uncorrectable threshold or when the determined correctable percentage is not less than a correctable threshold,
    wherein the setting occurs when the persistency counter at least meets the defined number of times.

11. The method of claim 8, wherein uncorrectable percentage determination further comprises:
    counting a number of uncorrectable errors in the defined frequency range of the upstream communications; and
    determining the uncorrectable percentage from the number of uncorrectable errors.

12. The method of claim 11, wherein correctable percentage determination further comprises:
    counting a number of correctable errors in the defined frequency range of the upstream communications; and
    determining the correctable percentage from the number of correctable errors.

13. The method of claim 8, wherein the interference alert is at least one of an audio alert or a visual alert.

14. A service provider system comprising:
    an upstream receiver configured to receive upstream signals from premises; and
    a processor in communication with the upstream receiver, the processer configured to:
    determine from an overlap frequency portion of the upstream signals an uncorrectable metric based on signal correction processing of the upstream signals;
    determine from the portion of the upstream signals a correctable metric based on signal correction processing of the upstream signals; and
    generate a non-termination alert when the determined uncorrectable metric at least meets an uncorrectable threshold and the determined correctable metric is less than a correctable threshold, wherein the non-termination alert indicates a presence of a non-terminated device in or at the premises.

15. The service provider system of claim 14, wherein the overlap frequency portion is related to a frequency range used by devices associated with different service providers.

16. The service provider system of claim 14, wherein the overlap frequency portion is related to a frequency range used by different networking devices in or at the premises.

17. The service provider system of claim 14, wherein the non-termination alert indicates a non-terminated pathway to a service provider central office from a non-terminated device in or at the premises when service is provided to the premises from another service provider central office.

18. The service provider system of claim 14, the processor further configured to:
   count a number of uncorrectable errors in the portion of the upstream signals;
   determine the uncorrectable metric from the number of uncorrectable errors;
   count a number of correctable errors in the portion of the upstream signals; and
   determine the correctable metric from the number of correctable errors.

19. The service provider system of claim 18, the processor further configured to:
   poll the portion of the upstream signals at defined intervals over the persistent period of time;
   determine whether the determined uncorrectable metric at least meets the uncorrectable threshold and the determined correctable metric is less than a correctable threshold for each polling event; and
   increment a counter each time the determined uncorrectable metric at least meets the uncorrectable threshold and the determined correctable metric is less than a correctable threshold,
   wherein non-termination alert generation occurs when the counter at least meets a defined threshold.

20. The service provider system of claim 19, the processor further configured to:
   reset the counter when the determined uncorrectable metric is less than the uncorrectable threshold or when the determined correctable metric is not less than a correctable threshold.

* * * * *